Figure 1:
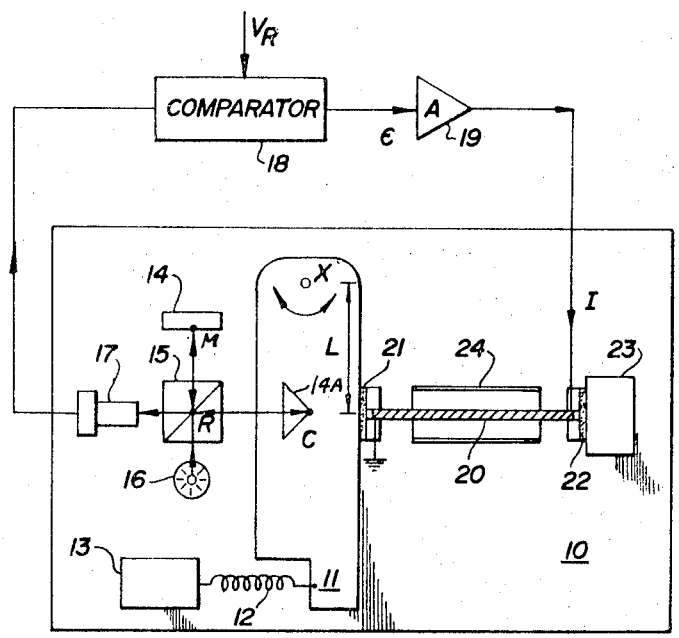

United States Patent
Bird et al.

[15] 3,658,425
[45] Apr. 25, 1972

[54] ELECTROMECHANICAL FEEDBACK DEVICE FOR FINE CONTROL OF A PLATFORM POSITION

[72] Inventors: Henry M. B. Bird, Vancouver, British Columbia; Geoffrey C. Dixon; J. Warwick Knowles, both of Deep River, Ontario, all of Canada

[73] Assignee: Atomic Energy of Canada Limited, Ottawa, Ontario, Canada

[22] Filed: Dec. 29, 1970

[21] Appl. No.: 102,359

[52] U.S. Cl. .................................................. 356/110
[51] Int. Cl. ............................................... G01b 9/02
[58] Field of Search .......................... 356/110, 141, 152

[56] References Cited

UNITED STATES PATENTS 3,427,108  2/1969  Vyce .................................. 356/152
3,582,211  6/1971  McClure ............................. 356/152

Primary Examiner—William L. Sikes
Attorney—James R. Hughes

[57] ABSTRACT

A feedback control system for controlling the position of a platform movably mounted on a datum base, comprising a wire of pre-set length attached to the platform and extending to and connected to a fixed position on said base, spring means connected between said platform and a second fixed position on said base for extending the wire, electro-optical means for detecting changes in position of said platform relative to the base and providing an error signal related to such changes and current generating means for applying a current related to said error signal to the wire to alter its length and thus the position of the platform to control and stabilize its position. The preferred form of electro-optical position detector would be a modified Michelson interferometer and the preferred method of altering the wire length would be by thermal expansion or magnetostriction.

4 Claims, 4 Drawing Figures

ELECTROMECHANICAL FEEDBACK DEVICE FOR FINE CONTROL OF A PLATFORM POSITION

This invention relates to an electromechanical device for the fine control of a platform position.

There are many applications where it would be desirable to be able to control the linear position of a platform to plus or minus a few angstroms and angular control to plus or minus a few milliarc-seconds. A few of such applications would be, e.g., in interferometric length measurements, image stabilization of terrestrial telescopes, and in angle measuring devices.

It is therefore an object of the present invention to provide a feedback control device having the necessary sensitivity and precision to control the position of a platform to compensate for the effect of environmental and system disturbances that might affect it.

This and other objects are achieved by a feedback control system for controlling the position of a platform movably mounted on a datum base, comprising a wire of a pre-set length attached to the platform and extending to and connected to a fixed position on said base, spring means connected between said platform and a second fixed position on said base for extending the wire, electro-optical means for detecting changes in position of said platform relative to the base and providing an error signal related to such changes and current generating means for applying a current related to said error signal to the wire to alter its length and thus the position of the platform to control and stabilize its position. The preferred form of electro-optical position detector would be a modified Michelson interferometer and the preferred method of altering the wire length would be by thermal expansion or magnetostriction.

Figure 2:
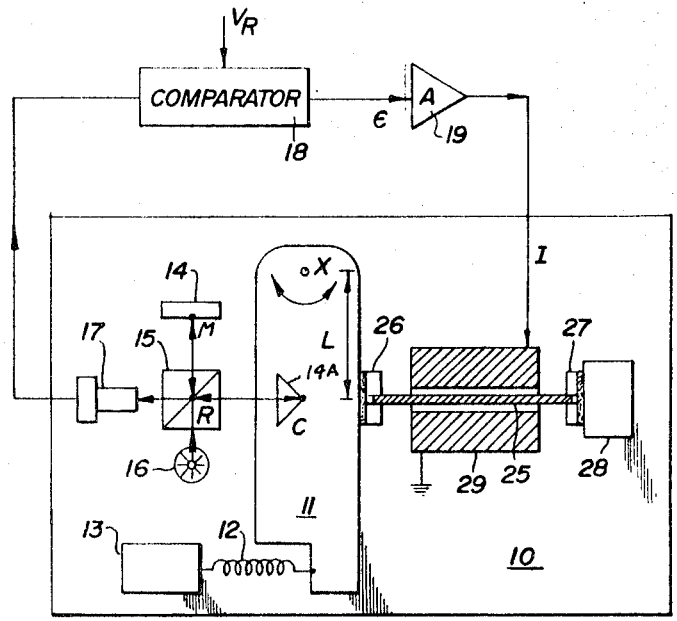
Figure 3:
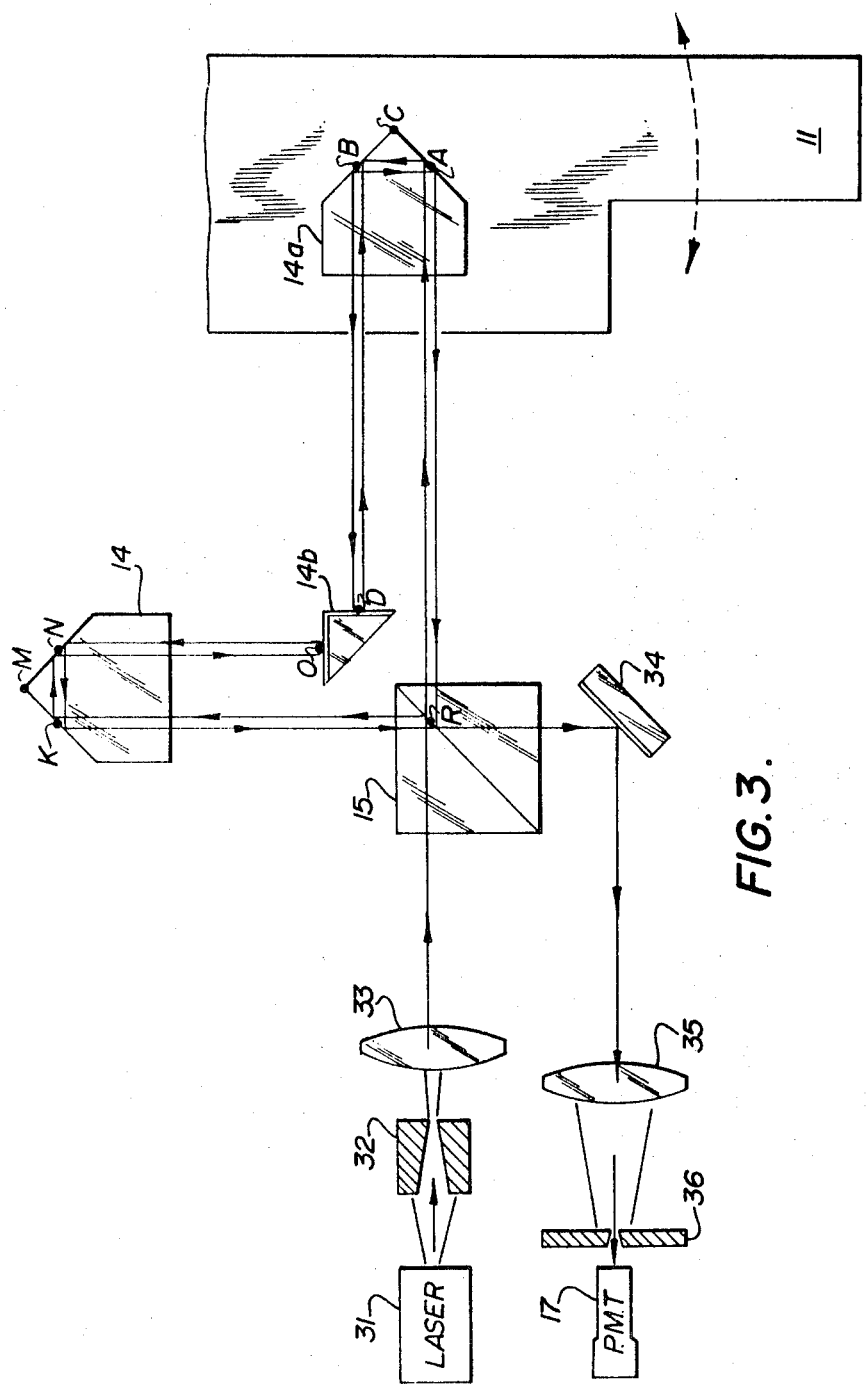
Figure 4:
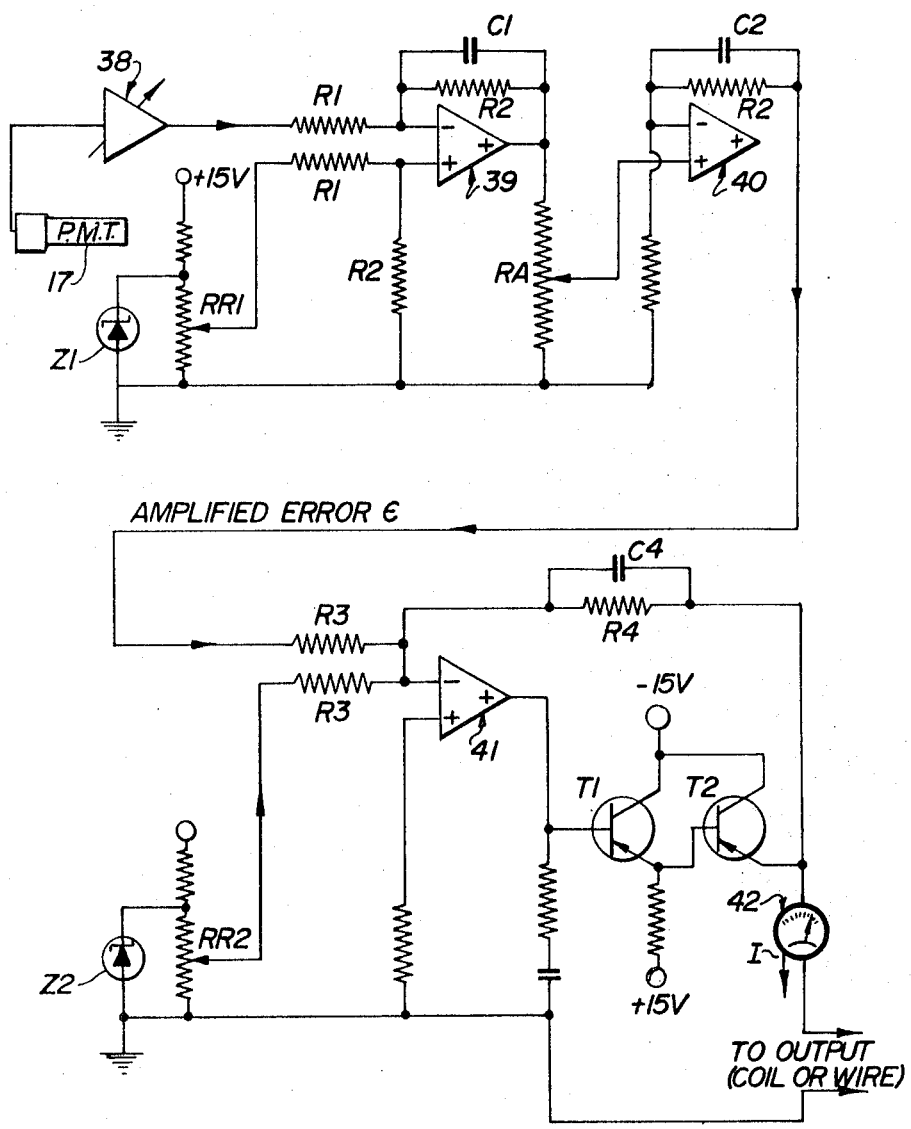

In drawings which illustrate embodiments of the invention,

FIG. 1 is a version of the device using thermal expansion effects for controlling the wire length, FIG. 2 is a version using magnetostriction of the wire, FIG. 3 is a detailed illustration of the interferometer used to measure the changes in position of the platform, and FIG. 4 is a detailed circuit diagram of the feedback unit made up of an error section and a feedback current producing section.

Referring to FIG. 1, a suitable base 10 has a platform 11 rotatably mounted thereon, pivoting about point X. A spring 12 connected between platform and a fixed block 13 urges the platform by means of spring 12 in the direction of the block, tensioning a metal wire, rod, or strip 20 fixed at one end to the platform by insulating connector 21 and at the other to a fixed block 23 by connector 22. A modified Michelson-Morley interferometer consisting of a light source 16, half-silvered splitter mirror 15, mirrors 14 and 14a measure the distance RC in relation to fixed distance RM and provides a light output in the form of interference fringes related to this length to photomultiplier tube 17 that provides an electrical reference $V_R$ in the comparator and an error signal $\epsilon$ is generated and applied to amplifier 19 which provides a current I that flows through wire 20 to ground. It has been found that wire 20, e.g., a 5 cm. long, 0.013 cm. diameter tungsten wire operating between 300 and 500° K has a relatively wide range of operation. In apparatus built and tested it has been found that a displacement of point C of the platform by $\approx 10^5$ A. can be obtained with a change of wire current of one ampere. However, changes in the angle through which the platform rotates about point X, resulting from a displacement of $10^5$ A. at point 21 can be made by changing length L.

FIG. 2 is a variant of the device of FIG. 1 in which the hot wire is replaced by a wire 25 whose length is varied by the magnetostrictive effect of the magnetic field set up by coil 29. Current I flowing through the coil varies this effect and thus the length of the wire. The wire must be nickel, Permendur-2V, or some other magnetostrictive material.

FIG. 3 shows some detail of the interferometer. Light from laser 31 passes through a pinhole 32 and collimated by lens 33. The beam is split at beam divider 15 with one beam reflected from a fixed corner-cube 14 to a mirrored prism 14b to be reflected back to corner-cube 14 and then back to beam divider 15. The other light beam traverses an equivalent path to corner-cube 14a on platform 11, to mirror 14b and back to beam divider 15. The beams re-combine and interfere at beam divider 15, are reflected from a fixed mirror 34, and the interference fringes are focussed by lens 35 on screen 36. The photomultiplier tube 17 views a portion of the interference fringe pattern through a hole in the screen. A corner-cube, which always reflects a beam of light in a direction parallel to the incident beam must be used on the platform because it rotates. Corner-cube 14 is used to keep the optical paths equivalent.

The change in number of interference fringes seen at the hole in the screen is a function of the difference in optical path length traversed by the two beams, i.e.

$$O.P.L. = RC - RM$$

where $RC = 2(RA + AB + BD)$ and $RM > 2(RK + 2KN + 2NO)$. Effectively, wherever the corner point C or corner-cube 14a moves one-fourth the wavelength of the laser light, there is a change of one full interference fringe seen by the photomultiplier tube.

FIG. 4 is a detailed feedback circuit with the signal from photomultiplier tube 17 amplifier 38 and compared to a reference voltage provided by zener diode Z1 and variable resistance RR1 in an operational amplifier 39 with suitable bias and feedback components R1, R2, and C1. The output of the amplifier is an error signal ($\epsilon$) and after passing through an attenuator RA and matching amplifier 40 (gain +1) is added to a constant bias voltage provided by zener diode Z2 and bias resistor RR2, in summing amplifier 41 (gain −1). The output of this amplifier controls current source amplifier made up of transistors T1 and T2. A control current I is produced that may be metered in ammeter 42 and is then applied to the hot wire or coil of FIGS. 1 or 2. The bias voltage is applied to maintain a current flowing in the electromechanical device to allow correctional displacements in both directions.

The two arrangements described above provide two ranges or frequency response for the feedback system controlling the platform. The range of frequency response of the hot wire (FIG. 1) is inversely proportional to its cross-sectional area and is nearly independent of its operating temperature. In general, the frequency response is limited to low frequencies, for example 0 to $\approx$ 20 Hz for the tungsten wire described above. For the magnetostriction arrangement of FIG. 2, the frequency response is from 0 to greater than 200 Hz. The upper level of the range is determined by the elastic properties of the wire and by the time constant ($\tau = L/R$) of the coil. The range of operation of this method is more restricted than the hot wire system. A displacement of the point C of $\approx 10^4$A. is obtained with a change of field $\approx$ 40 Oe which corresponds to a change of 1 ampere through the coil, for example given. This can be changed by change of the length L.

What is claimed:

1. A feedback control device for fine control of the position of a platform in relation to a datum position comprising:
   a. a metal wire of preset length connected to the platform and to a datum position,
   b. means for tensioning the wire,
   c. electro-optical means for determining platform position in relation to a reference and providing an electrical error signal related to platform displacement,
   d. current producing means for providing a control current related to said error signal, and
   e. means operative by the control current for changing the wire length in relation to the value of the control current.

2. A feedback control device as in claim 1 wherein the means operative by the control current is the wire adapted to pass the control current through a portion of its length to heat it and vary its length by thermal expansion effects.

3. A feedback control device as in claim 1 wherein the means operative by the control current is a coil surrounding the wire such as to vary the length of the wire by the magnetostrictive effects due to the magnetic field set up by the coil.

4. A feedback control device as in claim 1 wherein the electro-optical means is a Michelson-Morely interferometer comprising a laser light source, a light beam splitter, and a system of mirrors adapted to provide an optical output in terms of interference fringes related to the displacement of the platform and a photo-multiplier tube looking at the interference fringes and providing an electrical error signal output.

* * * * *